(12) United States Patent
Kakkad

(10) Patent No.: US 9,526,058 B2
(45) Date of Patent: Dec. 20, 2016

(54) SMART ROAM SYSTEM AND METHOD

(75) Inventor: Vishal Kakkad, Aliso Viejo, CA (US)

(73) Assignee: Lantronix, Inc., Irvine, CA (US)

( * ) Notice: Subject to any disclaimer, the term of this patent is extended or adjusted under 35 U.S.C. 154(b) by 13 days.

(21) Appl. No.: 13/024,247

(22) Filed: Feb. 9, 2011

(65) Prior Publication Data

US 2011/0194532 A1    Aug. 11, 2011

Related U.S. Application Data

(60) Provisional application No. 61/303,129, filed on Feb. 10, 2010.

(51) Int. Cl.
*H04W 4/00*    (2009.01)
*H04W 36/30*    (2009.01)

(52) U.S. Cl.
CPC ................................. *H04W 36/30* (2013.01)

(58) Field of Classification Search
CPC .............. H04W 36/0094; H04W 36/24–36/30; H04W 36/245; H04W 36/08
USPC .................................................. 370/328–338
See application file for complete search history.

(56) References Cited

U.S. PATENT DOCUMENTS

| 8,155,081 | B1 * | 4/2012 | Mater et al. | 370/331 |
|---|---|---|---|---|
| 2005/0182847 | A1 * | 8/2005 | Jawad Pirzada et al. | 709/233 |
| 2006/0067272 | A1 * | 3/2006 | Wang et al. | 370/331 |
| 2006/0142009 | A1 * | 6/2006 | Takaki | 455/436 |
| 2008/0089276 | A1 * | 4/2008 | Ito et al. | 370/328 |
| 2009/0010222 | A1 * | 1/2009 | Jechoux | 370/331 |
| 2009/0316658 | A1 * | 12/2009 | Kin | 370/332 |
| 2010/0113034 | A1 * | 5/2010 | Ricci et al. | 455/440 |
| 2010/0130211 | A1 * | 5/2010 | Bae et al. | 455/438 |
| 2010/0303051 | A1 * | 12/2010 | Umeuchi et al. | 370/338 |
| 2011/0122858 | A1 * | 5/2011 | Yashiro et al. | 370/338 |

OTHER PUBLICATIONS

IEEE 802.11-2007, "Wireless LAN Medium Access Control (MAC) and Physical Layer (PHY) Specifications", published before Dec. 31, 2007, cover + p. 190.*

* cited by examiner

*Primary Examiner* — Khaled Kassim
*Assistant Examiner* — Zhaohui Yang
(74) *Attorney, Agent, or Firm* — Rutan & Tucker LLP; Hani Z. Sayed

(57) ABSTRACT

Systems and methods for determining when to switch wireless access points from a current wireless access point to a new wireless access point are disclosed. In various embodiments the systems and methods monitor a signal strength received from the current wireless access point, monitor a signal strength received from the new wireless access point and compare the signal strength received from the wireless access points. Switching from the current wireless access point to the new wireless access point can occur, for example, when the signal strength received from the new wireless access point is greater than the signal strength received from the current wireless access point by a first pre-determined value.

16 Claims, 4 Drawing Sheets

SMART ROAM SYSTEM AND METHOD

PRIORITY CLAIM

This application claims priority to the earlier filed U.S. Provisional Patent Application No. 61/303,129 filed on Feb. 10, 2010 which is incorporated herein by reference.

FIELD OF THE INVENTION

The field of the invention relates to wireless communication system. More particularly, some embodiments relate to systems and methods for determining when to switch wireless access points from a current wireless access point to a new wireless access point.

BACKGROUND OF THE INVENTION

Wireless networks stress the importance of wireless capability and user mobility as an inherent benefit of use of wireless devices. When an individual is within range of a given access point, the individual may be able to freely and transparently access and utilize a specific network medium. However, an inherent problem with this type of wireless network and wireless capability is that the individual needs to be within a 802.11 Access Point (AP) range and this access point range is limited. To combat this limited availability and range problem, a large number of access points have to be deployed in order to provide comprehensive coverage of a building or a campus.

However, another problem that exists is that a higher degree of coordination and management may be necessary when trying to preserve the same level of network transparency across a group of access points. As an individual moves out of range of a specific access point coverage area, it may trigger a "handoff" to another access point to preserve the illusion of seamless connectivity.

These handoffs are directed by 802.11 standards which essentially dictate that handoffs should be managed independently by each individual without the prior knowledge of the network technology. This is contrary to cellular networks where handoff decisions are coordinated by the network and there is also a provision to continuously monitor signal quality between each client and all of its neighboring base stations.

In the absence of a control channel to provide information about the proximity of nearby APs, individuals using the wireless networks can only monitor the signal to the currently associated AP without incurring the overhead of channel switching and temporary loss of data connectivity while actively scanning for nearby APs. Handoff is typically triggered when signal quality and/or data transfer service degrades below an acceptable threshold.

However, a need still exists for an improved handoff system which allows for switching between APs associated with an individual's wireless capable wireless device. Further, a need still exists for an improved handoff system which allows the device to roam for a stronger AP signal without unnecessary interference by the wireless device and/or the individual user.

SUMMARY OF THE INVENTION

The present invention utilizes a basic handoff strategy which waits for a pre determined number of consecutive transmit failures to trigger the disconnect from the currently connected AP, which allows the device to start a scanning phase which will identify any nearby access points. After the scanning phase is completed, the device may select the best AP signal from the set of scanned APs and may begin a connection process to connect and complete the association and security negotiation steps with the chosen AP.

In an exemplary embodiment of the present invention, an improved handoff system is provided whereby the handoff system may allow the device to determine when to find an alternative access point and trigger for initiating handoff.

In yet another exemplary embodiment of the present invention, an improved handoff system is provided whereby the system may identify a set of access points within the proximity of the client and select one from the set.

Yet another exemplary embodiment is to provide an improved handoff system whereby the system may connect and then authenticate, associate and negotiate the security associated with the chosen AP.

In still another exemplary embodiment, an improved handoff system is provided whereby the system may provide a smoother transition between the first AP and a subsequent AP.

In another exemplary embodiment, an improved handoff system may be provided whereby the system may allow a wireless device user to maximize the AP signal received by their device.

In still another exemplary embodiment, an improved handoff system is provided whereby the system may allow the device to continually monitor for a stronger AP signal and allow the device to transition from a weaker AP signal to a stronger AP signal.

In an exemplary embodiment, an improved handoff system is provided and the system reduces overhead of managing handoffs actively.

Still another exemplary embodiment is to provide an improved handoff system whereby the system may eliminate slower handoffs and longer gaps in data connectivity that may adversely affect the application level response time and render those applications unusable.

In an exemplary embodiment, an improved handoff system is provided whereby the system may be incorporated in Wireless Device Server product lines.

Yet another exemplary embodiment of the present invention is to provide an improved handoff system whereby the system takes a proactive approach in managing handoffs by continuously monitoring the proximity and signal quality parameters of nearby access points belonging to the same ESS as the currently connected access point.

In yet another exemplary embodiment, an improved handoff system is provided whereby the system actively manages the dynamic set of APs in the ESS via periodic probe requests across all channels and stores relevant selection criteria for this set.

In still another exemplary embodiment, an improved handoff system is provided whereby the system monitors the current SNR to trigger the AP selection when the SNR value passes a pre defined minimum threshold.

Still another exemplary embodiment is to provide an improved handoff system whereby the handoff system allows for an AP selection algorithm that runs when specific events are triggered or when there are new scan results from the periodic probing. The algorithm uses the stored selection criteria to select a candidate AP. One such criteria would be to favor an AP when its measured SNR is at least above the associated access point. This avoids the unnecessary "ping-pong" effect when clients are equally "close" to different access points. The algorithm could evolve in the future to include other selection criteria as well.

In yet another exemplary embodiment, an improved handoff system is provided whereby the system may allow for selection of a chosen AP that is different from the associated AP, whereby the system may then disconnect the current AP and initiate the connection and security association negotiation phase within the chosen AP.

In still another exemplary embodiment, an improved handoff system is provided whereby the system may improve the timing of handoff decisions, thereby improving the individual user's signal quality.

Yet another exemplary embodiment is to provide an improved handoff system whereby the system may improve application response throughout by maintaining connectivity to a superior AP within the coverage area.

Still another exemplary embodiment is to provide an improved handoff system whereby the system may provide an architecture to incorporate other metrics as a criteria for candidate AP selection.

In yet another exemplary embodiment, switching from a first AP to a second AP may be completely client initiated.

Still another exemplary embodiment can be a client side application.

In yet another exemplary embodiment, pre-authentication may be performed before a determination is made to switch from a first AP to a second AP.

Various objects, features, aspects and advantages of the present invention will become more apparent from the following detailed description of preferred embodiments of the invention, along with the accompanying drawings in which like numerals represent like components.

DETAILED DESCRIPTION OF THE INVENTION

Figure 1:
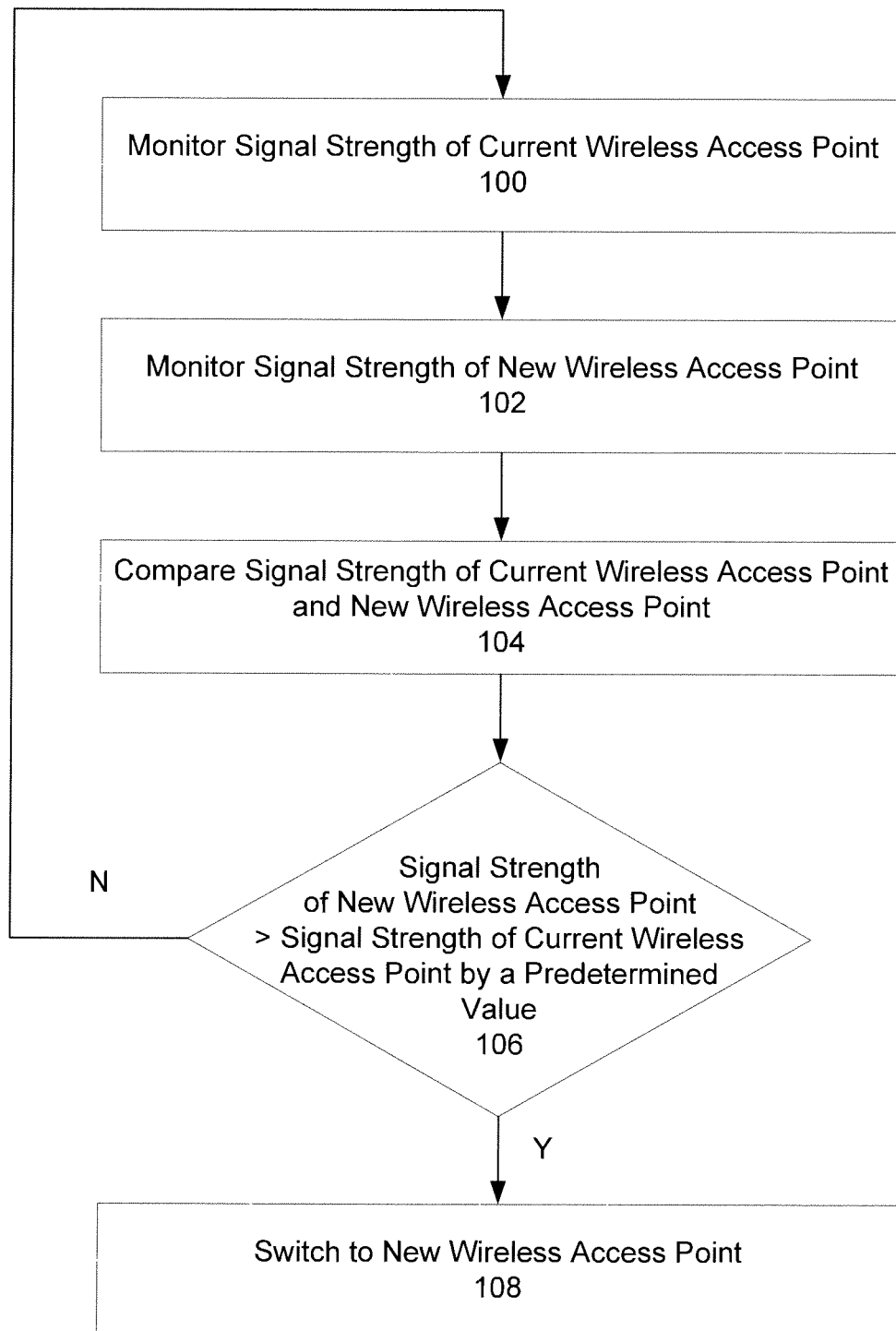
FIG. 1 is a flowchart illustrating an example method in accordance with the systems and methods described herein.

FIG. 1 is a flowchart illustrating an example method in accordance with the systems and methods described herein. The example method of FIG. 1 can determine when to switch wireless access points from a current wireless access point to a new wireless access point. In various embodiments the determination, switching, or both may be client side initiated. Accordingly, the systems and methods described herein may include a client-side application for client initiated switching from one wireless access point to another wireless access point. This may allow for greater client-side control as compared to systems that might include access points or other device external to the client device that determines and initiates switching from one access point to another.

In step 100 a client device can monitor signal strength from the current wireless access point. This may be accomplished even in instances when a client device can receive signals from the wireless access point but the client device does not transmit with enough power for a signal to be received by the wireless access point. For example, many systems may include access points that can transmit with higher power than a client device. In some cases transmit power might be varied based on distance between the wireless access point and the client device or received power at the wireless access point or at the client device.

In step 102 the client device can monitor signal strength of a new wireless access point. In this way the client device can monitor an area for access points such that the client device may manage connectivity to an access point and determine an access point that may provide good signal strength.

In step 104 the client device compares the signal strength of the wireless access point so that in step 108 the client device can switch from the current wireless access point to the new wireless access point when the signal strength of the new wireless access point is greater than the signal strength of the current wireless access point by a first pre-determined value. In some embodiments the pre-determined value might be 20 dB. It will be understood, however, that other values can also be used.

For example, a lower value might be selected to be sure to switch prior to losing the ability to receive signals from a wireless access point, to be sure to switch prior to losing the ability to successfully transmit signals to a wireless access point, or both. Alternatively, a higher pre-determined value might be used to decrease "thrashing," which is generally a somewhat continuous switching back and forth between wireless access points. Some embodiments might incorporate hysteresis to limit or eliminate thrashing. Additionally, other embodiments of the systems and methods described herein may use more complicated algorithms.

An algorithm used determination of when a wireless access point might be optimized for various mobile environments. For example, in a system used in a car, train, airplane, or other relatively fast vehicle it might be important to switch as soon as received signal strength begins to decrease. On the other hand, for slower systems such as systems pushed on a cart, e.g., a hospital cart; systems on a forklift; or other relatively slower moving vehicle limiting or eliminating thrashing might be a larger concern. The pre-determined value can be selected to take these issues into consideration.

In some embodiments, the received signal strengths used to determine when a switch from a current wireless access point to a new wireless access point may include passive scans of beacon signal strengths for each access point. For example, various wireless access points may transmit a beacon. The signal strength of this beacon may be a fixed value. In this way the method may compare beacon strengths to determine the strongest signal.

In another example embodiment, beacon signal strength might not be known, but may be related to other transmission signal strengths for a given wireless access point such that the beacon signal strength will provide an indication of the signal strength that might be received for other signals if that wireless access point was selected by the client device. It will also be understood that the transmit power of a transmission from a wireless access point may vary and that the beacon signal strength may indicate a current transmission power setting that may change at a later time.

Some embodiments of the systems and methods described herein may provide lower switching times between wireless access points by using pre-authentication. In one example, a wireless device may be pre-authenticated with a new access point prior to determining that the new access point meets one of the criteria for a switch and the received signal strength of the new wireless access point is greater than the received signal strength of the current wireless access point. For example, security associations may be time consuming.

Accordingly, pre-negotiating such associations may save time when a switch from a first wireless access point to a second wireless access point is desired. Pre-negotiating might be performed with one or more wireless access points that are within range of a wireless device but are not acting as the current wireless access point for the device, for example. Another example, systems a wireless device might pre-negotiate with a wireless access point that is not in range using the communication network and wireless access point that the wireless device is currently connected with. In this way connectivity may be established faster after a switch when the switch is required. In some embodiments pre-negotiation may be split into multiple data transmissions so that disruption of a user's data transmissions might be minimized or the disruptions might be less noticeable to the user because the pre-negotiation does not take a single larger block of time, but rather might use multiple small blocks of time. For example negotiation might require 0.5 seconds and might be broken into smaller blocks such as 50 ms. Using smaller blocks of time may reduce latency and improve background data flow.

Figure 2:
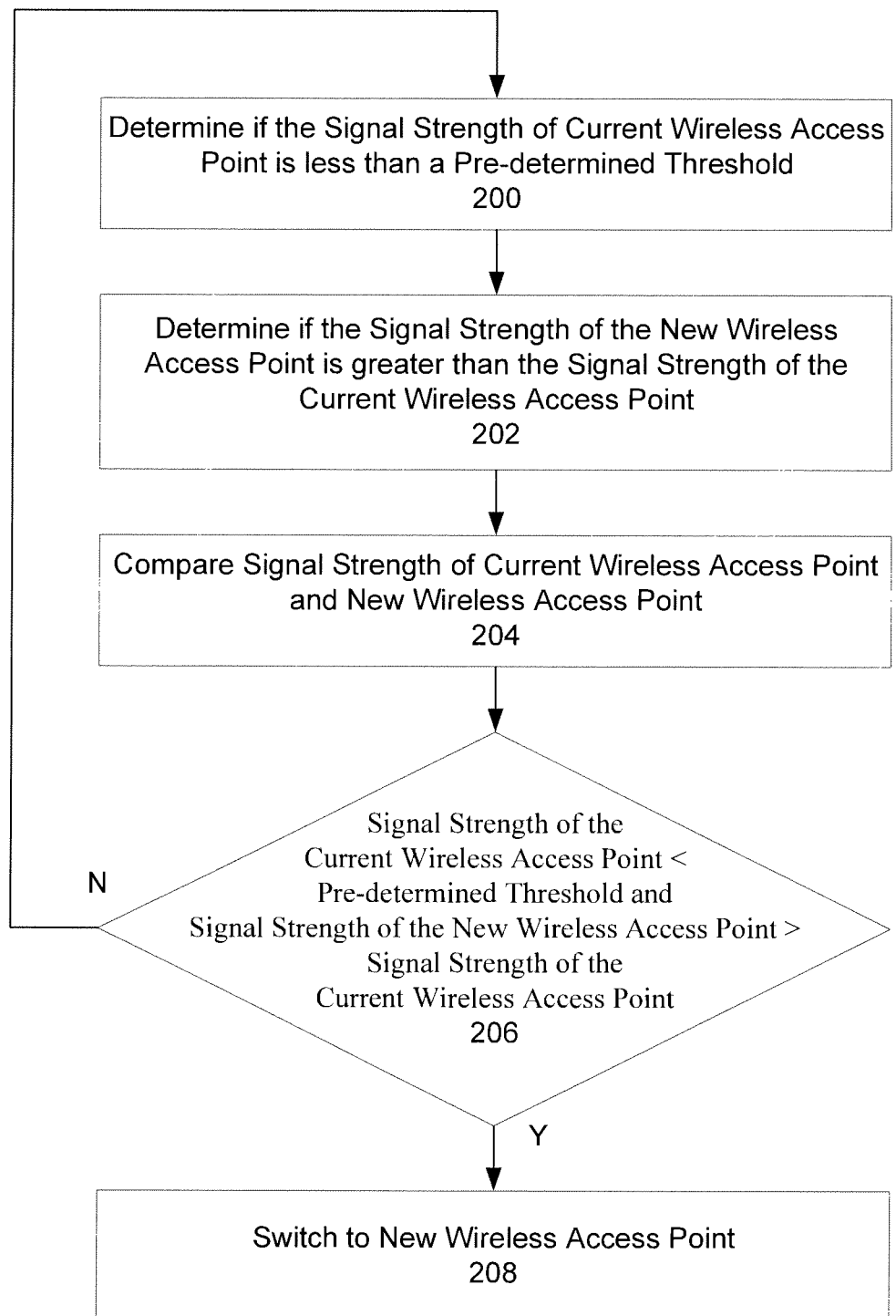
FIG. 2 is a flowchart illustrating an example method in accordance with the systems and methods described herein.

FIG. 2 is a flowchart illustrating an example method in accordance with the systems and methods described herein. In step 200 a client device can determine if the received signal strength of the current wireless access point is less than a pre-determined threshold. In step 202 the client device can determine if the received signal strength of the new wireless access point is greater than the received signal strength of the current wireless access point. In step 206 a client device switches from the current wireless access point to the new wireless access point when the received signal strength of the current wireless access point is less than a pre-determined threshold and the received signal strength of the new wireless access point is greater than the received signal strength of the current wireless access point.

In this way, when the received signal strength of the current wireless access point is below a predetermined threshold and another wireless access point has a higher received signal strength the higher received signal strength access point can be used. In instances when the current access point has adequate signal strength, e.g., above the pre-determined threshold, switching does not occur. This might limit thrashing or switching that would not generally increase performance of the system.

In embodiments where switch may be based on the current access point having a low received signal strength that is less than a pre-determined threshold other factors may also impact switching from the current access point to another access point. For example, in some embodiments switching based on the current access point having a low received signal strength less than a pre-determined threshold might only occur when the received signal strength of the new access point is greater than a second pre-determined value. In some example systems the second pre-determined value can be less than the first pre-determined value.

Figure 3:
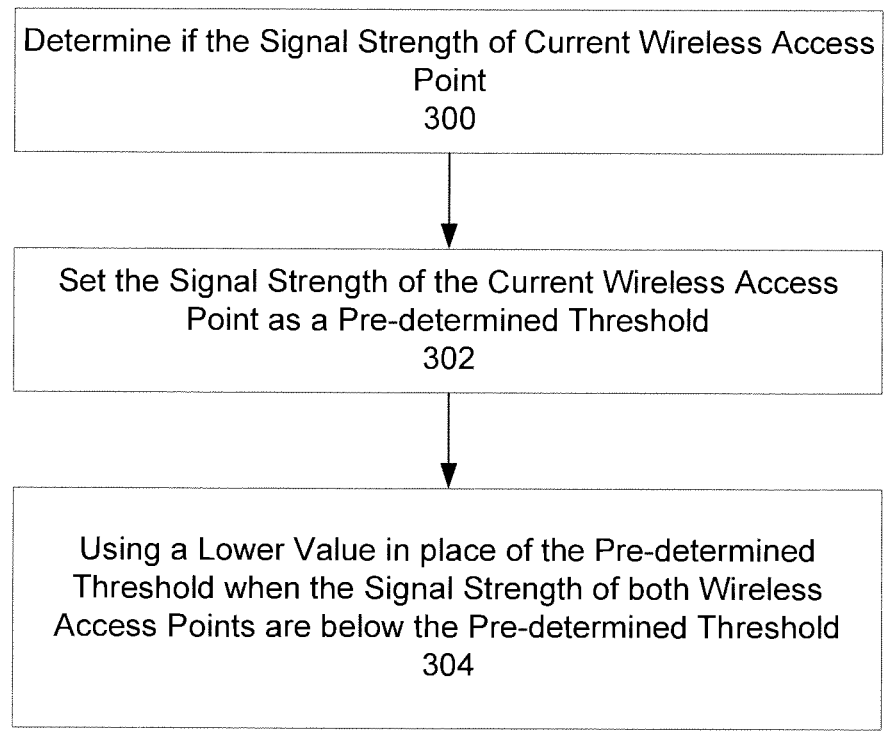
FIG. 3 is a flowchart illustrating an example method in accordance with the systems and methods described herein.

FIG. 3 is a flowchart illustrating an example method in accordance with the systems and methods described herein. In step 300 a client device can determine the received signal strength from the current access point. In step 302 the signal strength received from the current access point may be used as the pre-determined threshold. In step 304 the client device can use a lower value in place of the pre-determined threshold when the received signal strength of the current access point and the new access point are below the pre-determined threshold. This may be done to help limit or eliminate thrashing or other unwanted switching when the client device is receiving poor signal quality from multiple access points. This may be because the multiple access points are both far away, one or more access points is transmitting at a low power, or any other reason that might lead to low received signal strength.

Further, it will be understood that, while various examples may be presented with respect to a pair of access points, the systems and methods described herein may be applied to multiples of access points greater than two. For example various embodiments may comparing the received signal strength of the current access point to multiple new access points to determine if a switch should occur and which access point should be selected. In some embodiments the multiple access points can be grouped into at least two and each new access point in a group may be monitored before switching to another group.

It will be appreciated that received signal strengths from separate wireless access points will seldom, if ever, be exactly equal. Generally, however, embodiments of the systems and methods described herein may be configured such that a switch does not occur when wireless access points that can be received by the client device are both bad or both approximately equally bad.

In some embodiments, however, a lower threshold value might be used when signals from multiple wireless access points are each weak. This can allow a client device to access the best available access point when each access point is providing a generally weak signal, such as when the client device is at a location on the fringe of a network. Accordingly, a client device might switch to a new wireless access point when a switch would normally not otherwise occur. In some embodiments, thresholds might be user or administrator settable rather than preset such that modifications may be made based on operating conditions for a particular client device.

Figure 4:
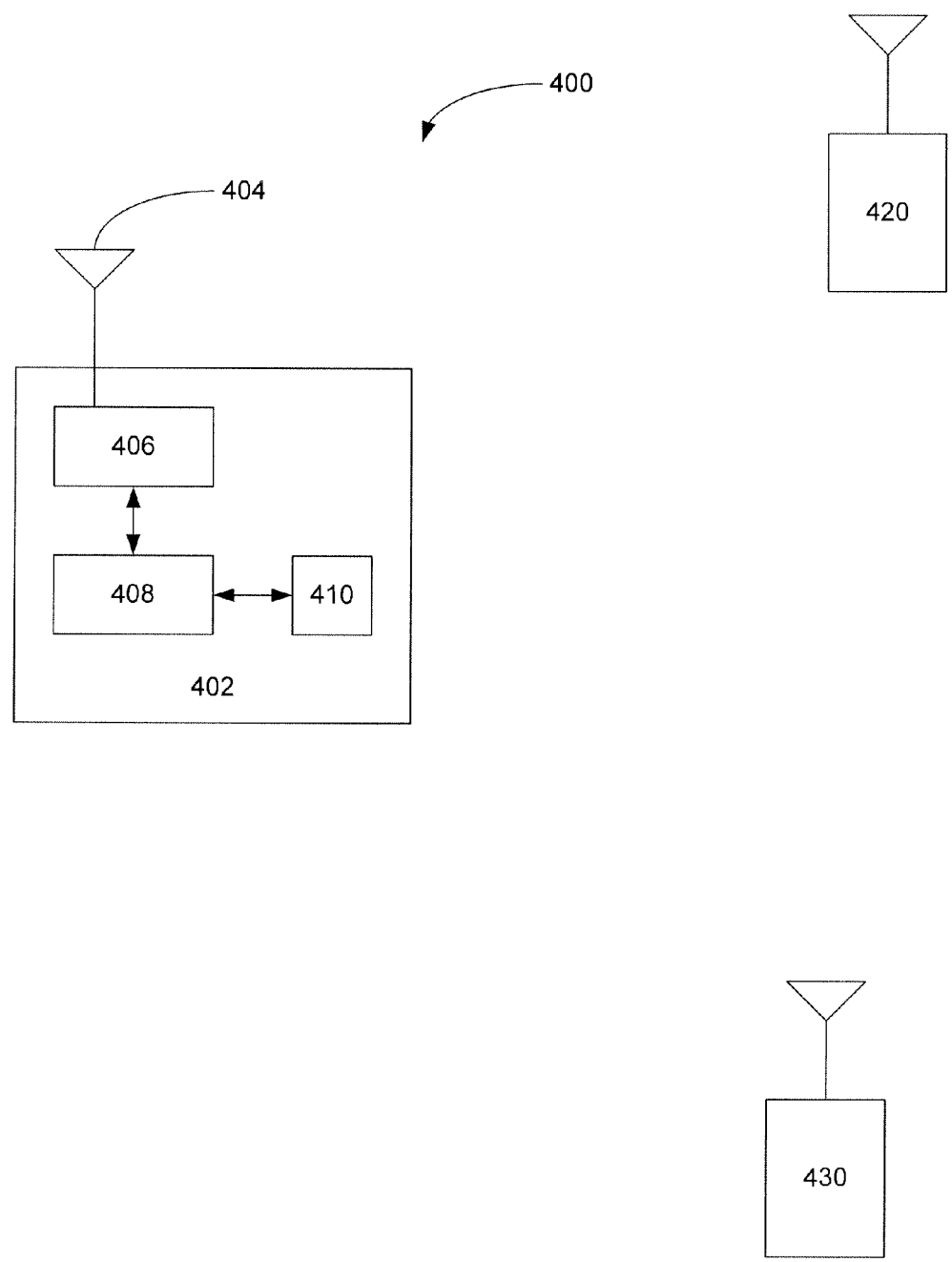
FIG. 4 is a block diagram of an example system in accordance with the systems and methods described herein.

FIG. 4 is a block diagram of an example system 400 in accordance with the systems and methods described herein. System 400 can include a mobile wireless device 402 and access points 420, 430. The wireless device 402 can include an antenna 404 for sending signals to access points 420, 430, receiving signals from access points 420, 430, or both.

The antenna can be coupled to a receiver 406, transmitter, or transceiver so that radio frequency of other transmissions might be received, transmitted, or both. These transmissions might be processed using processor 408 which can execute instructions from memory 410.

The memory might store data, instructions, or both. These instructions may cause the processor to perform the methods described herein. For example by executing the instructions the processor might monitor a received signal strength of the current wireless access point, monitor a received signal strength of the new wireless access point, compare the received signal strength of the wireless access points, and switch from the current wireless access point to the new wireless access point when the received signal strength of the new wireless access point is greater than the received signal strength of the current wireless access point by a first pre-determined value. One or more of these steps may be controlled directly by the processor or the processor might control other hardware to provide for one or more of these monitoring, comparing, and switching steps.

As described herein, some embodiments scan beacon signal strength to monitor received signal strength from one or more wireless access points. Some embodiments may perform these scans at various intervals. These intervals might be pre-determined. Alternatively, these intervals might vary depending, for example, on the signal strength received from the current wireless access point. Scanning may be triggered based on time or device transceiver usage. For example scanning might occur when the devices transceiver is not otherwise in use or when not in use. In another embodiment scanning may occur when signal quality for the current wireless access point is low. This might be measured using signal-to-noise ratio, bit-error rate, or other signal quality indicator. Additionally, scans may be progressive. For example, an overall spectrum to be scanned might be broken into smaller pieces that can be scanned one at a time to find wireless access points. The location of these access points may be stored so that they can be re-scanned without requiring scanning of an entire spectrum. From time to time the entire spectrum might be rescanned to find new wireless access points. Frequency of these rescans might be based on how fast a device is moving. Using multiple smaller spectrum scans may make the scans less disruptive to the user. Using smaller blocks of time may reduce latency and improve background data flow. For example, such a split may allow a user's data flow to appear to be uninterrupted.

Various systems and methods described herein provide examples related to client side applications that are client initiated switched from a first wireless access point to another wireless access point. Embodiments of the systems and methods described herein are not limited to client side applications with client initiated switching.

In various embodiments, one or more access points can be connected to a wired network. In some embodiments, these access points may be on a single Internet Protocol (IP) subnet. Accordingly, as a device moves from one wireless access point to another intra-subnet roaming may occur. In some examples, this might occur without changing the IP address.

Thus, specific embodiments and applications of methods, wireless devices, wireless communication systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced.

What is claimed is:

1. A method for determining when to switch a wireless device's connection from a current wireless access point to a new wireless access point comprising the following steps:
    setting a previously monitored signal strength from the current wireless access point as a threshold;
    progressively monitoring a signal strength received from the current wireless access point,
    wherein monitoring takes into account one of signal-to-noise ratio and bit-error rate;
    monitoring a signal strength, received from the new wireless access point;
    comparing the signal strengths received from the wireless access points;
    comparing the received signal strength received from the current wireless access point with the threshold;
    pre-authenticating the wireless device with the new wireless access point prior to the steps of comparing the signal strengths and comparing the received signal strength from the current wireless access point with the threshold, wherein pre-authenticating the wireless device comprises pre-negotiating of one or more security associations; and
    the using pre-authentication to switch the wireless device's connection from the current wireless access point to the new wireless access point when the signal strength received from the new wireless access point is greater than the signal strength received from the current wireless access point by a pre-determined difference value and when the signal strength received from the current wireless access point is less than the threshold.

2. The method of claim 1, further comprising reducing the threshold when the signal strength received from the current access point and the new access point are both below the threshold.

3. The method of claim 1, further comprising comparing the signal strength received from the current access point to multiple new access points to determine if a switch should occur.

4. The method of claim 3, wherein the multiple new access points are grouped into at least two groups and each new access point in a group is monitored before switching to another group.

5. The method of claim 1, wherein the step of monitoring the signal strength received from the current wireless access point comprises passively scanning a beacon signal from the current wireless access point.

6. The method of claim 1, wherein the step of pre-authenticating the device with the new wireless access point occurs when the wireless device is out of range of the new wireless access point.

7. The method of claim 1, wherein the step of pre-authenticating the device with the new wireless access point comprises splitting a pre-negotiation into a plurality of data transmissions.

8. The method of claim 1, further comprising setting, in response to switching the wireless device's connection from the current wireless access point to the new wireless access point, the monitored signal strength received from the new wireless access point as the threshold.

9. A client-side wireless device comprising:
    an antenna;
    a receiver, coupled to the antenna;
    a processor coupled to the receiver and configured to control a functionality of the wireless device;
    a memory coupled to the processor and storing instructions to cause the processor to:
    set a previously monitored signal strength from the current wireless access point as a threshold;
    progressively monitoring a signal strength received from the current wireless access point,
    wherein monitoring takes into account one of signal-to-noise ratio and bit-error rate;
    monitor a signal strength received from the new wireless access point;
    compare the received signal strengths of the wireless access points;
    compare the received signal strength received from the current wireless access point with the threshold;
    pre-authenticate the client-side wireless device with the new wireless access point prior to the steps, of comparing the signal strengths and comparing the received signal strength from the current wireless access point with the threshold wherein pre-authenticating the client-side wireless device comprises pre-negotiating of one or more security associations; and use the pre-authentication to switch the wireless device's connection from the current wireless access point to the new wireless access point when the received signal strength of the new wireless access point is greater than the received signal strength of the current wireless access point by a pre-determined difference value and when the signal received from the current wireless access point is less than the threshold.

10. The wireless device of claim 9, wherein the instructions further cause the processor to reduce the threshold when the received signal strength of the current access point and the new access point are both below threshold.

11. The wireless device of claim 9, wherein the instructions further cause the processor to compare the received signal strength of the current access point to multiple new access points to determine if a switch should occur.

12. The wireless device of claim 11, wherein the multiple new access points are grouped into at least two groups and each new access point in a group is monitored before switching to another group.

13. The wireless device of claim 9, wherein the instruction, to monitor the signal strength received from the current wireless access point comprises passively scanning a beacon signal strength received from the current wireless access point.

14. The method of claim 9, wherein the instructions further cause the processor to pre-authenticate the client-side wireless device when the client-side wireless device is out of range of the new wireless access point.

15. The method of claim 9, wherein the instructions further cause the processor to split a pre-negotiation into a plurality of data transmissions and use those data transmissions to pre-authenticate the client-side wireless device.

16. The method of claim 9, wherein the instructions further cause the processor to set, in response to switching the wireless device's connection from the current wireless access point to the new wireless access point, the monitored signal strength received from the new wireless access point as the threshold.

* * * * *